United States Patent [19]

Michalik

[11] Patent Number: 4,644,178
[45] Date of Patent: Feb. 17, 1987

[54] SIGNAL PROCESSING FOR OPTICAL IMAGE SENSOR

[75] Inventor: John K. Michalik, Sloan, N.Y.

[73] Assignee: Warner Lambert Technologies, Inc., Morris Plains, N.J.

[21] Appl. No.: 678,622

[22] Filed: Dec. 6, 1984

[51] Int. Cl.$^4$ .............................................. H01J 40/14
[52] U.S. Cl. ..................................... 250/578; 358/213
[58] Field of Search .......................... 250/214 R, 578; 307/261, 311, 351; 358/213

[56] References Cited

U.S. PATENT DOCUMENTS 4,293,877 10/1981 Tsunekawa et al. ................. 358/213
4,535,294 8/1985 Ericksen et al. ................ 307/261 X

FOREIGN PATENT DOCUMENTS 0071143 2/1983 European Pat. Off. .

OTHER PUBLICATIONS

Electronics, May 24, 1979 issue, p. 144, by Saul Malkiel.

Primary Examiner—Eugene R. LaRoche
Assistant Examiner—James C. Lee
Attorney, Agent, or Firm—Alan H. Spencer

[57] ABSTRACT

A circuit and method for converting signals from a photoelectric image sensor into digital signals containing information as to a characteristic of the sensor signals. The photoelectric image sensor provides output pulses having characteristic determined by the manner in which light is incident thereon and this, in turn, is determined by a light influencing medium in an optical path between a light source and the image sensor. In particular, the peak amplitude of each signal from the sensor is determined and then converted into a digital signal containing information as to the peak amplitude. This is accomplished by detecting the rise of each sensor signal to a peak amplitude and then holding a signal level corresponding to the peak level of the sensor signal as the sensor signal falls in amplitude for a time at least equal to the time for acquiring or converting into the digital signal. In particular, there is provided a peak detector circuit operatively connected to the photoelectric image sensor for detecting the peak amplitudes of signals obtained from the sensor and an analog to digital converter connected to the peak detector circuit for providing digital signals containing information as to peak amplitudes of the sensor signals. The peak detector circuit comprises a portion responsive to the rise of each sensor signal to a peak amplitude and a portion for holding a signal level corresponding to the peak level of each sensor signal as the sensor signal falls in amplitude for a time at least equal to the acquisition time or conversion time of the analog-to-digital converter.

11 Claims, 3 Drawing Figures

SIGNAL PROCESSING FOR OPTICAL IMAGE SENSOR

BACKGROUND OF THE INVENTION

This invention relates to the art of processing information from optical image sensors, and more particularly to a new and improved circuit and method for converting signals from a photoelectric image sensor into digital signals containing information as to a characteristic of the sensor signals.

One area of use of the present invention is with solid state image sensors of the photoelectric type for providing output signals having a characteristic determined by the manner in which light is incident thereon. Such sensors include an arrangement of photoelectric elements along a line or in a pattern or array which elements periodically are electrically sampled or scanned to provide a series of output signals or pulses. The amplitudes of these pulses contain information as to the amount and location of light incident on the sensor. For converting this analog information to digital form for information processing, integration techniques have been employed which involve determining the area under a curve defined by a series of such pulses.

However, situations can arise where it would be useful to have information as to the absolute value or amplitude or each pulse. This would allow pulse-to-pulse amplitude comparisons, for example, and provide rate of change information. Accordingly, it would be highly desirable to provide a signal processing circuit enabling such information to be obtained from photoelectric image sensors of this general type.

SUMMARY OF THE INVENTION

It is, therefore, a primary object of this invention to provide a new and improved circuit and method for converting signals from a photoelectric image sensor into digital signals containing information as to a characteristic of the sensor signals.

It is a further object of this invention to provide such a circuit and method which obtains information as to the absolute value or amplitude of each signal from the sensor.

It is a more particular object of this invention to provide such a circuit and method for use with sensors including an arrangement of photoelectric elements along a line or in a pattern or array which periodically are scanned to provide output signals.

It is a more particular object of this invention to provide such a circuit and method which enables pulse-to-pulse amplitude comparisons and development of rate of change information.

It is a further object of this invention to provide such a circuit which is relatively simple in structure and yet highly effective and efficient in operation.

The present invention provides a circuit and method for converting signals from a photoelectric image sensor into digital signals containing information as to a characteristic of the sensor signals. The photoelectric image sensor provides output pulses having a characteristic determined by the manner in which light is incident thereon and this, in turn, is determined by a light influencing medium in an optical path between a light source and the image sensor. In accordance with the present invention, the peak amplitude of each signal from the sensor is determined and then converted into a digital signal containing information as to the peak amplitude. This is accomplished by detecting the rise of each sensor signal to a peak amplitutde and then holding a signal level corresponding to the peak level of the sensor signal as the sensor signal falls in amplitude for a time at least equal to the time for acquiring or converting into the digital signal. In particular, there is provided peak detector circuit means operatively connected to the photoelectric image sensor for detecting the peak amplitudes of signals obtained from the sensor and analog to digital converter means operatively connected to the peak detector circuit means for providing digital signals containing information as to peak amplitudes of the sensor signals. The peak detector circuit comprises means responsive to the rise of each sensor signal to a peak amplitude and means for holding a signal level corresponding to the peak level of each sensor signal as the sensor signal falls in amplitude for a time at least equal to the acquisition time or conversion time of the analog-to-digital converter means.

The foregoing and additional advantages and characterizing features of the present invention will become clearly apparent upon a reading of the ensuing detailed description together with the included drawing wherein:

BRIEF DESCRIPTION OF THE DRAWING FIGURES

DETAILED DESCRIPTION OF THE ILLUSTRATED EMBODIMENT

Figure 1:
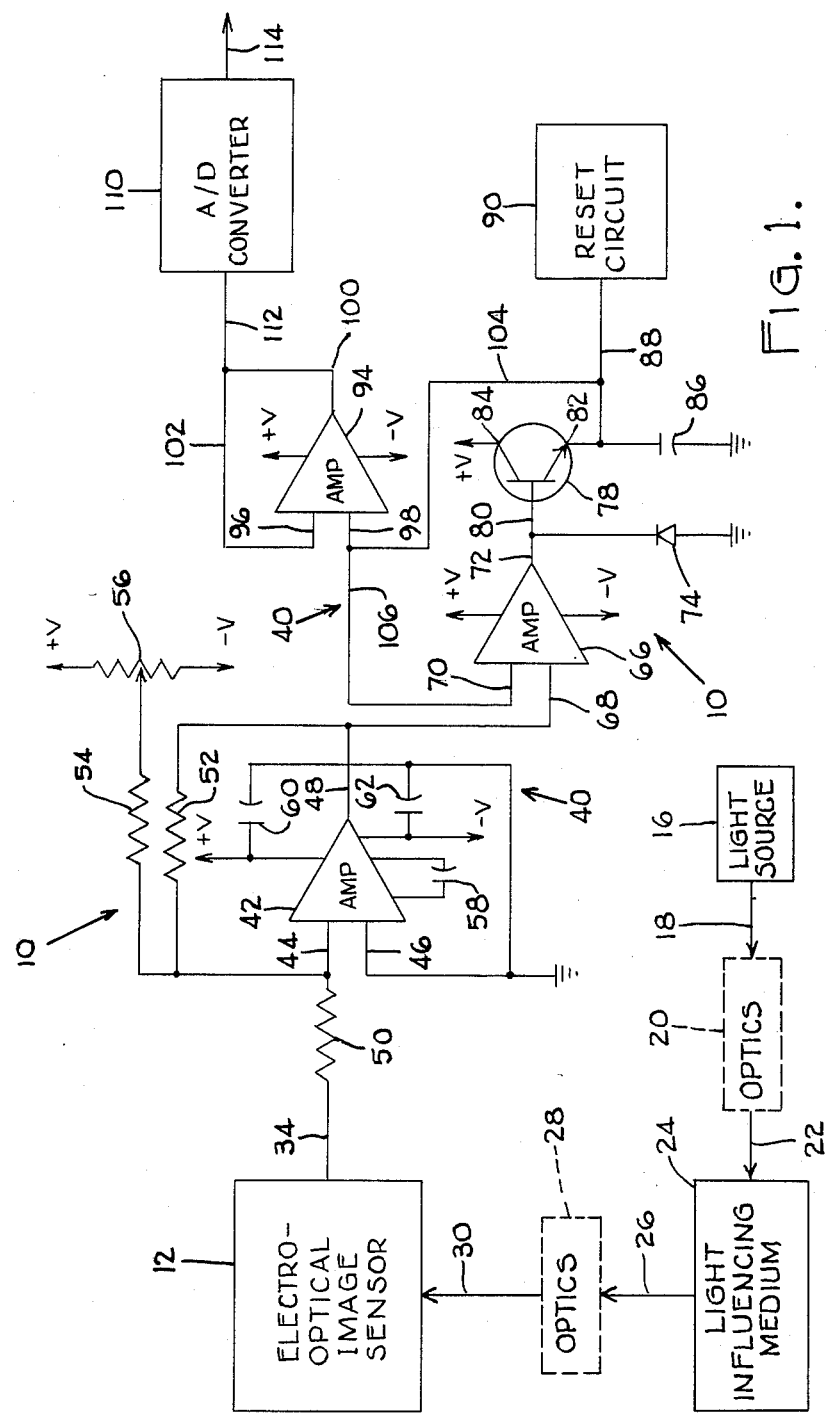
FIG. 1 is a schematic circuit diagram illustrating the circuit and method of the present invention for converting signals from a photoelectric image sensor into digital signals containing information as to a characteristic of the sensor signals.

Referring now to FIG. 1, then is shown a circuit 10 according to the present invention for converting signals from a photosensitive means generally designated 12, in the form of an electro-optical image sensor, into digital signals containing information as to a characteristic of the signals from photosensitive means 12. The photosensitive means 12 receives an image in the following manner. A light source 16 provides output light rays along a path 18 which can be focused or otherwise optically influenced by optical means 20 in the form of a lens or the like. The light from optics 20 travels along a path 22 and is incident on a light influencing medium 24 which can have various forms which will be described. Light influenced by medium 24 travels along a path 26 and can be focused or otherwise optically influenced by optical means 28 in the form of lenses or the like. The light from optics 28 travels along a path 30 and is incident upon the sensor 12. The amount and location of light 30 incident on sensor 12 is determined by optical characteristics or properties of medium 24 as will be described.

The electro-optical image sensor 12 is of the photoelectric type for providing output signals having a characteristic determined by the manner in which light is incident thereon. Sensor 12 typically has a relatively narrow dynamic range for providing output signals as a function of the amount and location of light incident thereon. Sensor 12 can be of the solid state type including an arrangement of photoelectric elements along a line or in a pattern or array which elements periodically are electrically sampled or scanned to provide a series of output signals or pulses. The amplitudes of these pulses contain information as to the amount and location of light incident on the sensor. This analog information is converted to digital form for information processing.

The amount and location of light incident on sensor 12 is influenced by the nature or characteristics of medium 24. This, in turn, depends upon the nature of the system in which the arrangement of FIG. 1 is employed. For example, it can find use in imaging techniques and edge detection such as in microscopic examination of biological specimens and integrated circuit chips, the specimens or chips being the medium 24.

In accordance with the present invention, the output signals from sensor 12 are converted to digital form in a manner providing information as to the absolute value or amplitude of each pulse. The output signals from sensor 12 are applied by line 34 to the remainder of the circuit 10 for signal processing and analog-to-digital conversion which circuit includes a peak detector circuit according to the present invention generally designated 40 for detecting the peak amplitudes of the signals obtained from sensor 12 during scanning thereof. The peak detector 40 includes an input amplifier 42 having inputs 44,46 and an output 48. Amplified output signals from sensor 12 present on line 34 are applied through a resistor 50 to the amplifier input terminal 44. A feedback resistor 52 is connected between the amplifier output 48 and input terminal 44. The junction of input terminal 44 and feedback resistor 52 also is connected through a resistor 54 to the wiper arm of a potentiometer 56. The other input terminal of amplifier 42 is connected to the circuit ground or reference. A biasing circuit for amplifier 42 includes capacitors 58, 60 and 62.

The peak detector circuit further includes an amplfier 66 having a pair of inputs 68 and 70, and an output 72. Amplifier input 68 is connected to the output 48 of amplifier 42. The cathode of a clamping diode 74 is connected to the amplifier output 72 and the anode is connected to an internal reference or ground.

The peak detector further comprises a transistor 78 having base, emitter and collector terminals 80 and 82 and 84, respectively. Base terminal 80 is connected to output 72 of amplifier 66. Emitter terminal 82 is connected through a capacitor 86 to the internal ground or reference and is connected also through a line 88 to a reset circuit 90 for timing operation of the circuit in a manner which will be illustrated.

The peak detector further comprises an amplifier 94 connected as a voltage follower and having a pair of inputs 96 and 98 and an output 100 which is connected by a line 102 back to the amplifier input 96. The emitter terminal 82 of transistor 78 is connected by line 104 to the amplifier input 98 which input also is connected by line 106 to the input 70 of amplifier 66 as shown in FIG. 1.

The circuit of FIG. 1 further comprises an analog-to-digital converter 110 having an input 112 connected to the output 100 of the peak detector circuit. Converter 110 converts the input signals on line 112 to a multiple bit digital output present on a corresponding plurality of output lines collectively designated 114 in FIG. 1. Thus, the digital signals on lines 114 are digitized amplitudes of the individual pulses or pixels from sensor 12.

The circuit of FIG. 1 operates in the following manner. The output of sensor 12 is present on line 34 and consists of a series of pulses or pixels generated during each scan and there being one pixel for each scanned photoelectric element such as photodiodes in sensor 12. The amplitudes of the pixels are proportional to exposure of incident light on sensor 12. These pulses are applied to the peak detector 40 in the circuit of FIG. 1 which plays an important role in achieving accuracy in the digital information contained in the signals present on output line 114. In particular, information is provided as to the absolute value or amplitude of each pulse from the output of sensor 12 to enable pulse-to-pulse amplitude comparisons and rate of change information to get the desired accuracy.

The provision of peak detector 40 assures that the amplitude information of each pixel from sensor 12 is obtained for use by the system. In particular, where the acquistion or conversion time of A/D converter 110 is greater than the pulse width of the individual pixels from sensor 12, peak detector 40 functions to seize or grab the amplitude information. Each individual pixel from sensor 12 is amplified by amplifier 42 and applied to input 68 of amplifier 66. Amplifier 66 provides an output when the signal on input 68 is greater than that on input 70, and diode 74 clamps output 72 to a predetermined level, for example 0.7 volts. During the rise of the individual pixel toward its peak amplitude, transistor 78 is turned on to charge capacitor 86. When the peak amplitude is reached and the pulse then begins to fall, capacitor 86 holds a level corresponding to the peak pixel amplitude and as the signal on input 68 falls, the amplifier output 72 goes to zero thereby turning off transistor 78. The level held on capacitor 86 is applied through amplifier 94 to analog-to-digital converter 110, and this level which corresponds to the pixel peak amplitude is present for a time at least equal to the acquisition or conversion time of converter 110. Thereafter, a discharge path for capacitor 86 is provided along line 88 under control of reset circuit 90. The foregoing is repeated for each pixel on line 34 from sensor 12, and each time the level on capacitor 86 may be different dependent upon the peak amplitude of each pixel.

Figure 2:
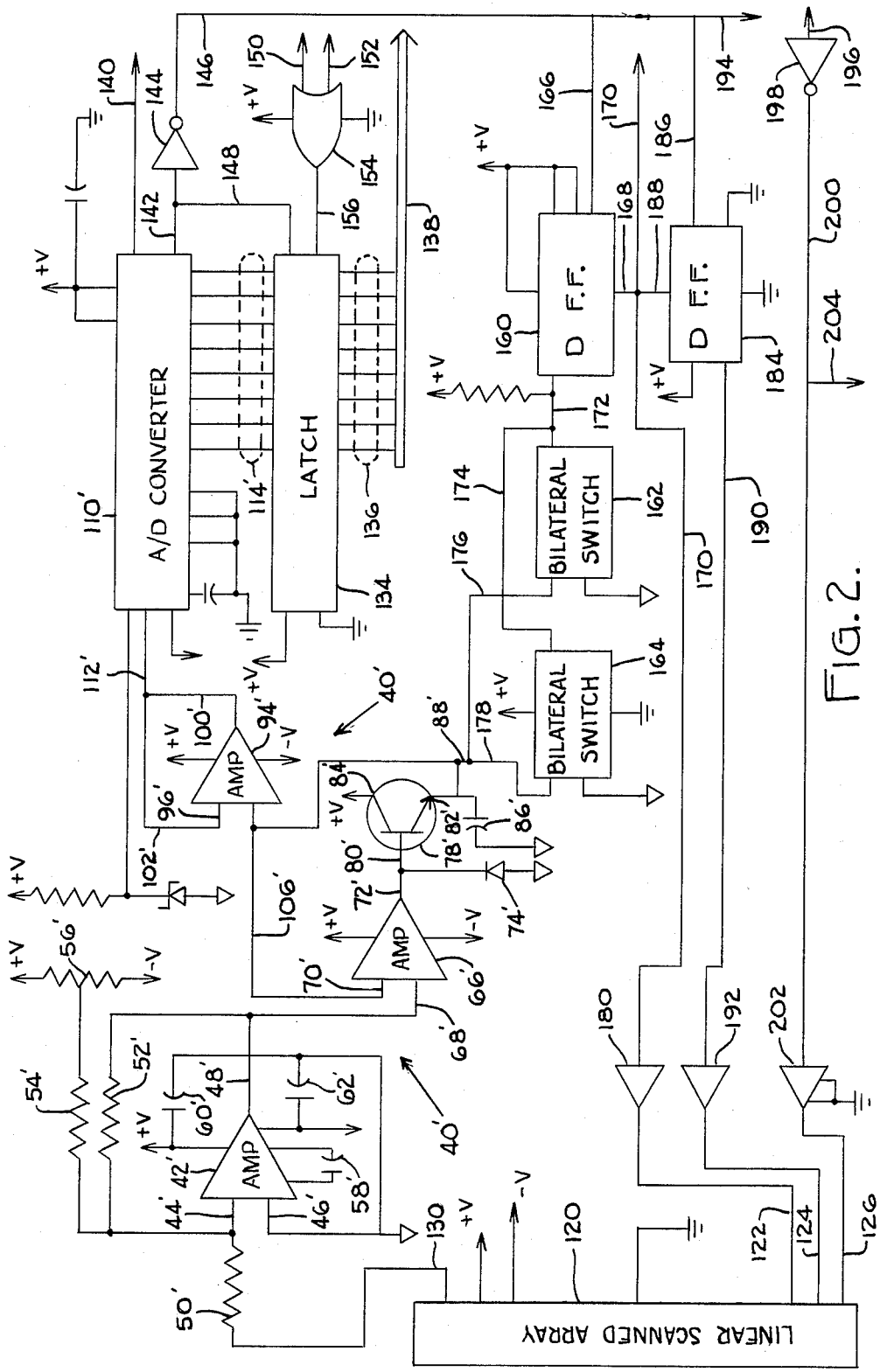
FIG. 2 is a schematic circuit diagram further illustrating the circuit and method of the present invention with an exemplary form of photoelectric image sensor.

The present invention is illustrated further by the circuit of FIG. 2 wherein the optical image sensor is in the form of a linear scanned array 120. The array device 120, briefly, is monolithic, self-scanning linear photodiode array consisting of a row of silicon photodiodes, each with an associated storage capacitor on which to integrate photocurrent and a multiplex switch for periodic readout by means of an integrated shift register scanning circuit. During each scan of the array, the charge on each photodiode is removed by photocurrent which is the product of diode sensitivity and light intensity or irradiance. By way of example, in an illustrative circuit an array device 120 is a G Series solid state line scanner model RL1024G available commercially from EG&G Reticon of Sunnyvale, Calif. This exemplary array includes 1024 photodiode elements. For more detailed information with respect to the structure and operation of device 120, reference may be made to the four page product description no. 18220 from EG&G Reticon entitled "G Series Solid State Line Scanners 128, 256, 512 and 1024 Elements", the disclosure of which is hereby incorporated by reference.

Turning now to the circuitry associated with array device 120, clock pulses, recharge pulses and start pulses on lines 122, 124 and 126, respectively, are applied to respective terminals of array 120 and are obtained from a timing portion of the circuit which will be described in detail presently. The array 120 is connected to suitable positive and negative operating and bias voltages in an appropriate manner. Output signals from array 120 are connected to the input of a peak detector circuit 40' which is the same as peak detector 40 of the circuit of FIG. 1. Accordingly, like components are identified by the same reference numerals provided with a prime designation. The output of peak detector 40' is connected by line 100' to the input 112' of an analog-to-digital converter 110' which converts the input signals on line 112' to an eight bit digital output present on the eight output line designated 114' in FIG. 2. Outputs 114' in turn, are connected to inputs of a latch circuit 134 to interface with a system bus portion 138. The eight bits of the latch output are present on lines 136 and provide the digitized value of each of the 1024 array output pulses provided during each scan thereof. The provision of latch 134 increases the speed by which this digital information can be placed on and taken off, the system bus. Timing pulses for operating converter 110' are present on line 140 connected to an appropriate source of system timing signals. Snychronizing signals from converter 110' are on line 142 and applied through an inverter 144 and a line 146 to other circuit components to be synchronized in operation with converter 110, and the same signals are connected through line 148 to latch 134. The latch 134 also is connected to other portions of the system by means of lines 150 and 152 connected to corresponding inputs of an Or gate 154, the output of which is connected by line 156 to an appropriate terminal of latch 134.

By way of example, in an illustrative circuit, amplifer 42' is type CA 3100, amplifiers 66' and 94' are type LF 356, converter 110' is type ADC 0820 and latch 134 is type 74LS 373.

The circuit of FIG. 2 also includes a reset circuit for the peak detector 40' including the combination of a D flip-flop 160 and a pair of CMOS bilateral switches designated 162 and 164. The switches 162 and 164 advantageously have a low leakage current during the off state. Flip-flop 160 has an input 166 connected to line 146 from the analog-to-digital converter 110'. Flip-flop 160 has a clock input 168 connected to a line 170 containing timing pulses which are obtained from an appropriate source of system timing pulses. The output of flip flop 160 is connected by line 172 to the input of switch 162 and by line 17 to the input of switch 164. The outputs of switches 162 and 164 are connected by lines 176 and 178, respectively, to line 88' leading to the peak detector circuit 40'.

The circuit of FIG. 2 also includes interfacing portions for driving the array 120. The previously mentioned timing signals on line 170 obtained from an appropriate system source are connected to the input of an amplifier 180, the output of which is connected to the clock pulse line 122 in the circuit of FIG. 2. There is also provided a D flip-flop 184 having an input 186 connected to line 146 from the analog-to-digital converter 110' having a clock input 188 connected to line 170 for receiving timing pulses, and having an output 190 connected to the input of an amplifier 192, the output of which is connected to the recharge signal line 124. Signals applied to the input 186 of flip flop 184 also are applied by line 194 to a system control. In addition, start pulses for the array 120 are obtained from a suitable system source via line 196 which is coupled through an inverter 198 via line 200 to the input of an amplifier 202, the output of which is connected to the start pulse line 126 connected to array 120. The output of inverter 198 also is connected by a line 204 to a system control.

The circuit of FIG. 2 operates in the following manner. Turning first to linear scanned array 120, it consists of a row of silicon photodiodes, each with an associated storage capacitor on which to integrate photocurrent and a multiplex switch for periodic readout via an integrated shift register scanning circuit. Array 120 operates in the charge storage mode whereby the charge output of each diode, below saturation, is proportional to exposure, i.e. the irradiance or light intensity multiplied by the integration time or the time interval between successive start pulses. The light sensing area of array 120 is a long, narrow rectangular region defined by an aperture in an opaque mask, the photodiodes extend across the aperture, and the entire aperture is photosensitive because photocurrent generated by light incident between the photodiodes will be collected by the nearest diode. The multiplex swtiches of array 120 are sequentially closed for one clock period by the shift register scanning circuit thereby recharging each cell to a level, for example 5 volts, and storing a charge, for example approximately 3 p.c., on its capacitance. The scanning circuit is driven by the clock pulses present on line 122 with a periodic start pulse introduced via line 126 to initiate each scan. The cell-to-cell sampling rate is the clock frequency, i.e. the frequency of pulses on line 122, and the total time between line scans is the interval between start pulses on line 126. During this line time the charge stored on each photodiode in array 120 is gradually removed by photocurrent. The photocurrent is the product of the diode sensitivity and the light intensity or irradiance. The total charge removed from each cell is the product of the photocurrent and the line time. This charge is replaced by a voltage on the recharge line 124 in FIG. 5 when the diode is sampled and reset once each scan.

Figure 3:
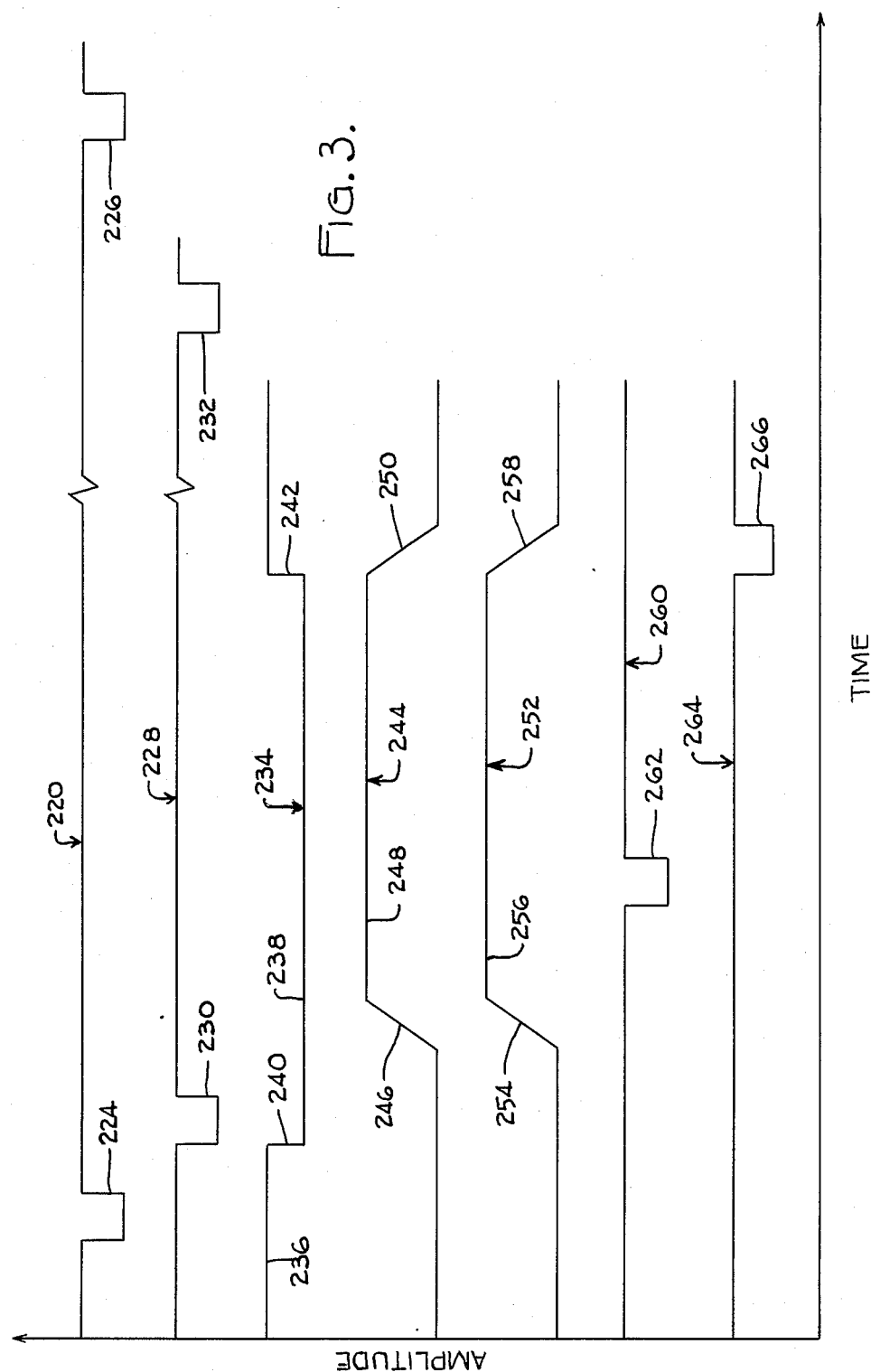
FIG. 3 is a graph including waveforms illustrating operation of the circuit of FIG. 2.

The foregoing is illustrated further by the waveforms shown in the timing diagram of FIG. 3. Waveform 220 shows two successive or adjacent start pulse signals 224 and 226 applied to line 126 in the circuit of FIG. 2. The time between two start pulses such as pulses 224 and 226 in FIG. 3 corresponds to one complete scan of all elements in array 120. By way of example, in an illustrative system wherein array 120 has 1024 elements, the time between two adjacent start pulses, i.e. the time for one scan, is 80 milliseconds. Waveform 228 shows two successive or adjacent clock pulse signals 230 and 232 applied to line 122 in FIG. 2. The time between two array clock pulses such as pulses 230 and 232 in FIG. 3 includes the time for signal processing of a single pixel in peak detector 40' plus the analog-to-digital conversion in converter 110'. By way of example, in an illustrative system, the time between two adjacent array clock pulses is 60 micro seconds.

Waveform 234 is the recharge signal present on line 124 in the circuit of FIG. 2. It includes an off level 236 and an on level 238, the latter providing the recharge function for array 120 as previously described. The transition 240 between off and on levels coincides in time with the leading edge of each array clock pulse, for example pulse 230 as shown in FIG. 3. The transition or return 242 from on to off occurs in time prior to the next array clock pulse, for example pulse 232 as shown in FIG. 3.

Waveform 244 represents the signal on input 68' of amplifier 66' and is a pixel from array 120 amplified by amplifier 42'. It includes a ramp-like leading edge 246, a relatively flat horizontal portion 248 and a trailing edge 250 which begins at a time coinciding with the transition 242 of recharge signal 234. The transition of the recharge signal is utilized to cause drop-off of the signal 244. Waveform 252 represents the signal on output 100' of amplifier 94'. It mirrors signal 244 and includes a ramp-like leading edge 254 coinciding in time with leading edge 246 of waveform 244, a relatively flat horizontal portion 256, and a trailing edge 258 which coincides in time with trailing edge 250 of waveform 244. The trailing edge 258 results from discharge of capacitor 86' through line 88' by operation of flip-flop 160 and switches 162, 164 in the circuit of FIG. 2.

Waveform 260 is the signal on line 140 to converter 110' in FIG. 2. It includes a pulse 262 which commands operation of converter 110'. Pulse 262, in turn, is triggered by a clock signal from an appropriate source in the circuit of FIG. 2. The time delay between the leading edge of array clock pulse 230 and the leading edge of pulse 262 provides a setting time for the analog-to-digital conversion and has a duration of about 3 micro seconds. Waveform 264 is the signal from converter 110' applied to inverter 144 which is connected by line 146 to flip-flop 160 and 184 in FIG. 2 and to the system control by line 194. It includes a pulse 266 which signals the end or completion of the analog-to-digital conversion provided by converter 110'. The conversion time, i.e. operation of converter 110', is measured between pulses 262 and 266 is about 2.5 micro seconds. The leading edge of pulse 266 triggers flip-flop 160 to cause discharge of capacitor 86' reflected in the fall of waveform 252, and it triggers flip-flop 184 to switch on the recharge signal 234.

The eight output pulses from A/D converter 110' represent the digitized value of each of the array output pulses or pixels. The relatively flat or horizontal top portions of the pixels processed by peak detector 40' enhances the ability of converter 110' to digitize the signals. In binary form the eight pulses provide a range of 0–255, i.e. $2^8$, for digitized values of each pixel amplitude. The same output quantities are obtained from latch 134 which enhances speed of transmission to and from bus portion 138.

In the illustrative circuit of FIG. 2, the optical image sensor is in the form of a linear scan array. Other forms of image sensors can include area sensors, such as Reticon solid state image sensor arrays RA-50 and RA-32, and Fairchild CCD211 and CCD221 element arrays. Another form of image sensor would be a vidicon camera tube wherein the analog output signal is time sliced to resemble the series of output pulses from the scanned arrays.

The circuit of the present invention is employed in situations where it is useful to have information as to the absolute value or amplitude of each pulse from an optical image sensor of the photoelectric type. Such information provides a high degree of accuracy useful in areas such as imaging techniques including video operations and edge detection including video operations and edge detection including microscopic examination of specimens for details of edges and surfaces and microscopic examination of integrated circuit chips for imperfectious, cracks and the like. For another illustration of the circuit and method of the present invention, in this case for use in an automatic digital refractometer, reference may be made to pending U.S. patent application Ser. No. 678,932 filed Dec. 6, 1984 and entitled "Automatic Refractometer", the disclosure of which is hereby incorporated by reference.

It is a therefore apparent that the present invention accomplishes its intended objects. While an embodiment of the present invention is described in detail, that is for the purpose of illustration, not limitation.

I claim:

1. In an electro-optical system having an image sensor including a plurality of photoelectric elements and means for directing light onto said sensor at a location influenced by a medium in the path of the light, said sensor providing signals having amplitude determined by the manner in which light is incident on the sensor, the improvement comprising:
    (a) peak detector circuit means operatively connected to said sensor for detecting the peak amplitudes of signals obtained from said sensor, said peak detector circuit comprising means responsive to the rise of each sensor signal to a peak amplitude and means for holding a signal level corresponding to the peak level of each said sensor signal as said sensor signal falls in amplitude for a time at least equal to the acquisition time of said converter means; and
    (b) analog to digital converter means operatively connected to said peak detector circuit means for providing digital signals containing information as to peak amplitudes of said sensor signals.

2. Apparatus according to claim 1, wherein said peak detector circuit means comprises:
    (a) differential amplifier means having first and second inputs and an output, said first input being coupled to said image sensor;
    (b) clamping means connected to the output of said differential amplifier means;
    (c) capacitor means;
    (d) semiconductor switching means having a control terminal connected to said output of said differential amplifier means and connected to said capacitor means in a manner defining a charging path for said capacitor means;
    (e) means operatively connected to said capacitor means for defining a controlled discharge path for said capacitor means;
    (f) means for coupling the signal level developed on said capacitor means to said analog-to-digital converter means; and
    (g) means for applying the signal level developed on said capacitor means to said second input of said differential amplifier means.

3. Apparatus according to claim 2, wherein said coupling means comprises an amplifier connected as a voltage follower.

4. Apparatus according to claim 1, further including means for sampling said photoelectric elements to provide a series of output signals, the amplitudes of said signals containing information as to the amount and location of light incident on said sensor.

5. A circuit for processing signals from a photoelectric image sensor for application to an analog-to-digital converter, said sensor providing output signals having an amplitude determined by the manner in which light is incident thereon, said analog-to-digital converter providing digital signals containing information as to amplitudes of said sensor output signals, said processing circuit comprising: peak detector circuit means adapted for operative connection to said sensor for detecting the peak amplitudes of signals obtained from said sensor, said peak detector circuit means comprising means responsive to the rise of each sensor signal to a peak amplitude and means for holding a signal level corresponding to the peak level of each said sensor signal as said sensor signal falls in amplitude for a time at least equal to the acquisition time of said converter means.

6. Apparatus according to claim 6, wherein said peak detector circuit means comprises:
   (a) a differential amplifier means having first and second inputs and an output, said first input being coupled to said image sensor;
   (b) clamping means connected to the output of said differential amplifier means;
   (c) capacitor means;
   (d) semiconducter switching means having a control terminal connected to said output of said differential amplifier means and connected to said capacitor means in a manner defining a charging path for said capacitor means;
   (e) means operatively connected to said capacitor means for defining a controlled discharge path for said capacitor means;
   (f) means for coupling the signal level developed on said capacitor means to said analog-to-digital convertor means; and
   (g) means for applying the signal level developed on said capacitor means to said second input of said differential amplifier means.

7. Apparatus according to claim 6, wherein said coupling means comprises an amplifier connected as a voltage follower.

8. Apparatus according to claim 5, further including means for sampling said photoelectric elements to provide a series of output signals, the amplitude of said signals containing information as to the amount and location of light incident on said sensor.

9. A method for processing signals from an electro-optical image sensor of the photoelectric type providing signals having amplitudes determined by the manner in which light is incident on the sensor comprising the steps of:
   (a) detecting the peak amplitude of each sensor signal by detecting the rise of each sensor signal to a peak amplitude and holding a signal level corresponding to the peak level of each sensor signal as said sensor signal falls in amplitude for a time at least equal to the time for acquiring or converting into said digital signal; and
   (b) converting the peak detected sensor signal into a digital signal containing amplitude information.

10. A method according to claim 9, further including the steps of:
   (a) directing light to a light influencing medium; and
   (b) directing light influenced by said medium onto said sensor to provide said sensor signals.

11. A method according to claim 9, further including the step of electrically scanning a plurality of photoelectric elements in said sensor to provide said sensor signals.

* * * * *